United States Patent [19]

Goncalves

[11] Patent Number: 5,125,847
[45] Date of Patent: Jun. 30, 1992

[54] COUPLING DEVICE FOR PIPELINE HEATING SYSTEM

[75] Inventor: Carlos Alberto D. Goncalves, Rio de Janeiro, Brazil

[73] Assignee: Petroleo Brasileiro S.A., Rio De Janeiro, Brazil

[21] Appl. No.: 759,291

[22] Filed: Sep. 13, 1991

[30] Foreign Application Priority Data

Oct. 2, 1990 [BR] Brazil .............................. PI 9004940

[51] Int. Cl.⁵ .............................................. H01R 4/60
[52] U.S. Cl. ..................................... 439/193; 285/41; 174/47
[58] Field of Search ................ 439/190, 191, 193, 95, 439/92, 100; 285/41, 47; 174/47, 68.1

[56] References Cited

U.S. PATENT DOCUMENTS

| | | | |
|---|---|---|---|
| 4,012,092 | 3/1977 | Godbey | 439/191 |
| 4,215,384 | 7/1980 | Elson | 174/47 |
| 4,577,664 | 3/1986 | Takahashi et al. | 174/47 |

*Primary Examiner*—L. I. Schwartz
*Assistant Examiner*—Hien D. Vu
*Attorney, Agent, or Firm*—Sughrue, Mion, Zinn Macpeak & Seas

[57] ABSTRACT

A device electrically connects fluid-carrying pipelines, particularly subsea pipelines carrying viscous fluids and/or containing organic residues, allowing for the application of electricity through same, with the purpose of heating those pipelines, so as to prevent or eliminate deposits of organic residues onto the internal walls of the pipelines. The device permits also the utilization of electricity in combination with the simutaneous injection of special fluids. Basically, it includes an electrically conducting pipe (5) which is introduced in a terminal pipe (1) carrying viscous fluid, which is put in contact with the internal steel layer (3) of the terminal pipe (1) by means of electrically conducting fastening element (8).

2 Claims, 2 Drawing Sheets

COUPLING DEVICE FOR PIPELINE HEATING SYSTEM

FIELD OF THE INVENTION

This invention refers to a device for the coupling of fluid-carrying subsea pipelines, allowing for the passage of an electric current through same, with the purpose of, electrically heating those pipelines, preventing or eliminating deposits of organic residues at the internal walls of said pipelines. Such a device may be adapted to allow for the utilization of electricity combined with the simultaneous injection of special fluids, such as solvents, air or steam.

BACKGROUND OF THE INVENTION

In case of operation with subsea facilities for transportation of fluids, particularly fluids viscous and/or containing organic residues, one of the problems to be faced refers to obstruction in pipelines, due to the deposition of those materials onto the internal walls of the pipelines, caused by the temperature differential between the fluid transported and the environment.

It is well-known that, in regions of larger water depths, the temperature of the water reaches nearly 5° C. Therefore, the larger the temperature differential, the larger shall be the problems, since the tendency towards the formation of deposits shall increase, leading to full pipeline obstruction.

One alternative to overcome this problem consists of applying a pressure differential between the extremities of the pipeline with the purpose of forcing the fluid flow. However, when said pipelines are too extensive, the possibilities of utilization of the method become unfeasible, whether from the technical point of view, due to the dimensions of the equipment, or from the economic point of view.

Another known alternative consists of adding to the fluid being carried a special additive or solvent, so as to maintain the organic residues in solution.

A third alternative to prevent or minimize the formation of residues at the pipeline walls includes the maintenance of said pipeline walls heated, so that the temperature differential between same and the environment be sufficient to ensure the fluid flow.

This invention includes this last possibility, combining it, if required, with the use of special solvents for the fluid being transported. The technical problem to be overcome, however, consists exactly of finding a form of introducing electricity in the subsea pipelines, particularly when these pipelines are already installed at some hundreds of meters of depth.

DESCRIPTION OF THE PRIOR ART

It is well-known that, when an electric current is applied to an electrical conductor, a certain quantity of energy is transformed into heat. This phenomenon is known as Joule Effect and is widely applied in various areas of technical knowledge.

In the automotive industry, for instance, we may mention U.S. Pat. No. 4,815,769, in which is described a device to achieve the connection or distribution between fluid-carrying hoses and a heating element, with the purpose of preventing the fluid from congealing inside said hoses. In a portion of the hose a slot is opened in the wall thickness, and a heating wire is inserted therein. One extremity of the wire is connected and wound around a contact element, made of a heat-conducting material, which is lodged inside the hose; the other extremity extends outside the hose, being connected to a heating wire of a connector. The set is covered by an isolating coating so as to form a compact block, constituting a hose element which can be heated.

In the area of petroleum the Joule effect is utilized in Brazilian application PI 8692278, by the same applicant hereof, to heat a petroleum production string inside a well, the production flow of which was interrupted due to paraffin deposition inside the string, which prevented the pumping rod from moving.

This process, however, comes up against technical difficulties for application in subsea wells.

In the offshore petroleum production systems, due to the handling facility, the production lines, that is, the connections between the well and the platform, are achieve by means of flexible pipelines. These flexible pipelines are formed basically by alternate layers of steel spirals intercalated with layers of an isolating material as, for instance, a polyamide-base elastomer. The internal steel layer is interlocked, whereas the outermost layer is constituted by a cross-shield, with the purpose of providing the pipeline with a stronger structural reinforcement, this whole set being coated with a polyamide layer.

Thus, one object of this invention is to make an electric current cross the steel shield of the flexible pipeline, similarly to an electrical conductor, generating energy and dissipating a certain quantity of heat to the pipeline and to the fluid therein contained, maintaining the temperature differential the environment and the production line, so as not to interrupt the fluid flow.

Another object of this invention is to provide a device allowing for the introduction of electric current in subsea production lines.

Another object of this invention is to provide a device allowing for the simultaneous use of electric current and fluid injection in subsea production lines, with the purpose of eliminating and/or displacing obstructions caused by deposition of organic residues inside same.

Still another object of this invention is to provide a device to achieve the electric connection between the internal wall of a flexible pipeline and a pipeline for injection of special fluids, to be coupled to the production line.

SUMMARY OF THE INVENTION

This invention refers to a coupling device for a pipeline heating system formed basically by a segment of electrically conducting pipe which is introduced in a terminal pipe of a flexible pipeline and is maintained distant from the internal walls of said flexible pipeline by means of electrically isolating elements, said pipe segment having, in its extremity internal to the flexible pipeline, a fastening element which achieves also the electrical contact between the flexible pipeline and the electrically conducting pipe segment. The other extremity of the conducting pipe segment is connected to an electrical source or to an electric cable and fastened to the terminal pipe of the flexible pipeline by means of a sealing element and a coupling element, to ensure the tightness of the set to the penetration of moisture and sea water, or to the leaking of fluid from inside the production line, as the obstruction is being eliminated.

The characteristics and advantages of this invention shall become more evident as from the detailed description of the invention when taken as a whole with the Figures which accompany this specification.

DETAILED DESCRIPTION OF THE INVENTION

In accordance with the objects of this invention a device has been developed which allows for the coupling of flexible pipelines for operation in a heating system of said pipelines, particularly in case of transportation of fluids viscous and/or containing organic residues dissolved, through subsea facilities. Said device allows for the introduction of an electric current in the internal steel mesh of said pipelines, generating heat sufficient to cause the displacement of organic residues deposited onto the internal surface of said pipelines, leading eventually to the obstruction of said pipelines, as well as to maintain the temperature differential between the fluid transported and the external environment between values adequate to ensure the fluid flow.

Figure 1:
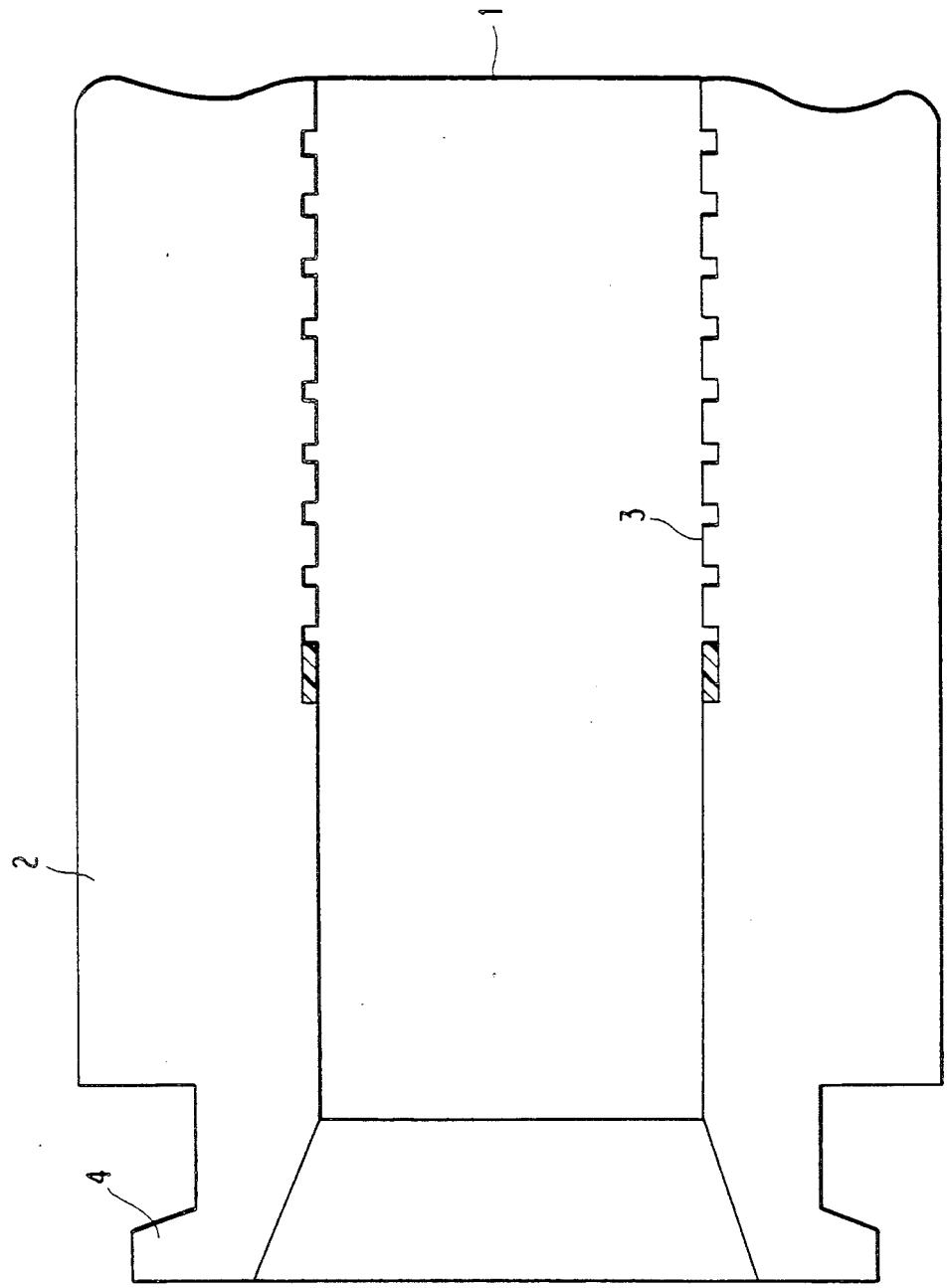
FIG. 1 represents schematically a terminal pipe of a conventional flexible pipeline.

As represented on FIG. 1, in the terminal pipe of a flexible pipeline (1), the external mesh (2) and elastomer layers extend a little beyond the internal steel layer (3) and form an edge (4), to allow for the coupling of the pipeline to other segments of flexible pipeline or to the inlet and outlet pipes of the equipment sets installed at the platform or at the manifolds, or else at the wellhead. These couplings are achieved by means of special brackets (not shown), which maintain those extremities tightly fastened between themselves.

The device of this invention is introduced through the terminal pipe (1) so as to allow an electrical contact to be achieved with the internal steel layer (3) of said terminal pipe.

Figure 2:
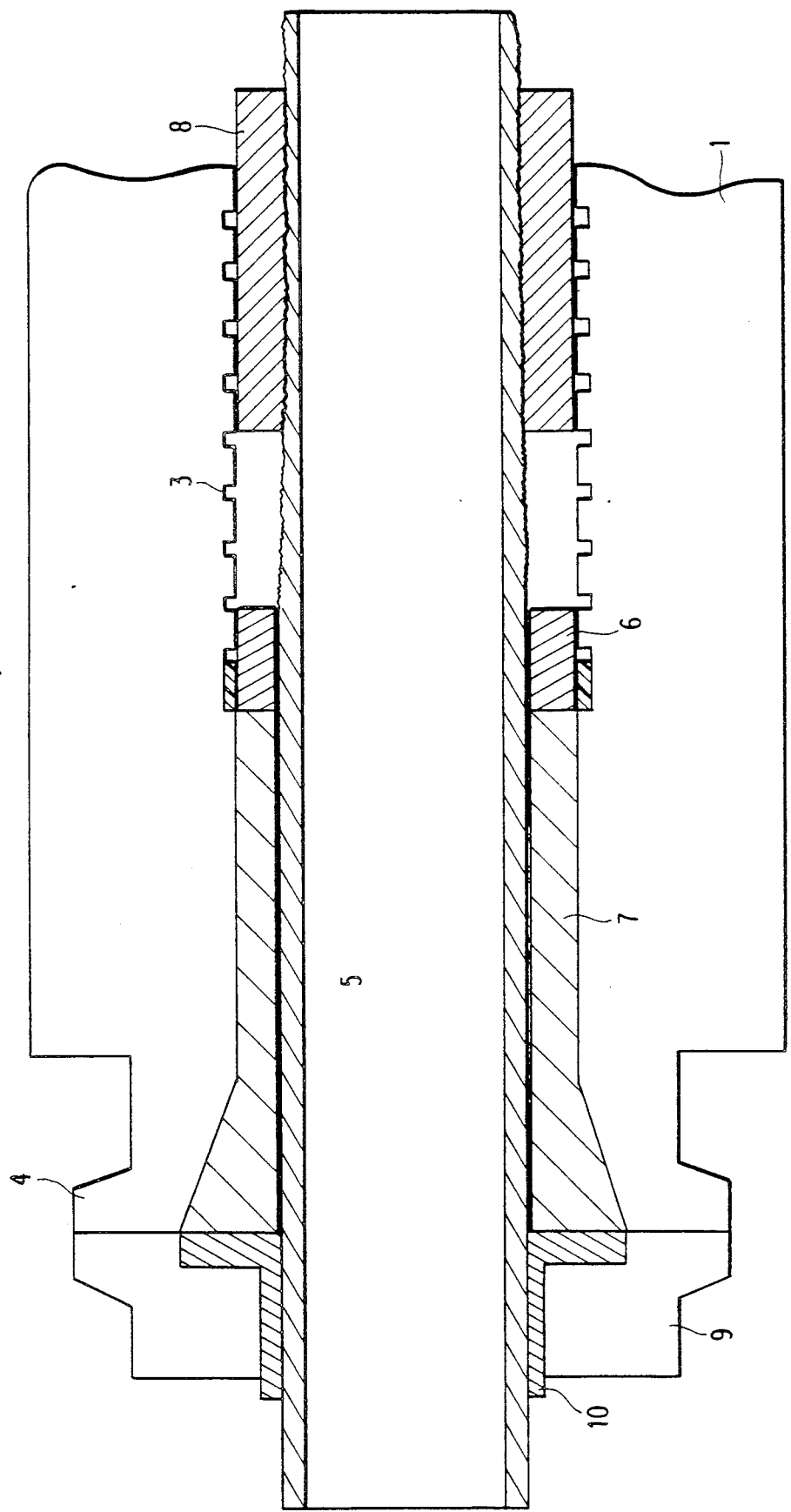
FIG. 2 shows the coupling device of the invention, fastened inside the terminal pipe of a flexible pipeline.

FIG. 2 shows in detail the device of the invention, lodged and fastened to the terminal pipe (1) shown on FIG. 1.

A segment of electrically conducting pipe (5) as, for instance, a steel pipe, is introduced in the terminal pipe of a flexible pipeline (1), being maintained far and equidistant from the internal walls of same by means of electrically isolating elements (6, 7), made of a material well known to the experts, such as TEFLON, CELERON, etc. The electrical contact between the two pipes—terminal pipe (1) and electrically conducting pipe (5)—is achieved by means of a fastening element (8) affixed to the internal extremity of the segment of electrically conducting pipe (5) and which has a thickness sufficient to touch the internal steel layer (3) of the flexible pipeline. To ensure the tightness of the set, to the edge (4) of the terminal pipe of the flexible pipeline a terminal element (9) is coupled, having the same external profile of said edge (4), so as to allow for the fastening and coupling of the two edges by means of brackets, as already described previously, said terminal element (9) being isolated from the electrically conducting pipe (5) by means of another sealing element (10), which also provides the electric isolation between the pipelines.

If required, the electrically conducting pipe (5) may be connected to a bifurcation in "T" or "Y" (not shown, so as to allow for the introduction of the special fluid into the production line simultaneously with the application of electricity.

Therefore, in practice, for the utilization of the system, it shall be sufficient to disconnect the extremities of the obstructed pipe or line, couple to devices of this invention and connect them to the source of electrical power.

A major advantage of the coupling device of this invention in relation to the known electrical connectors of the prior art is that electricity is conducted through an electrically conduct pipe, which allows for the simultaneous introduction of special fluids, such as solvents, air or water, thus making possible to optimize the pipeline heating system, more particularly the use of heat, for pipeline clearing. The combined use of heat and fluid injection shall permit that, as the displacement of the organic residue from the internal walls of the flexible pipeline is achieved, the solvent, the air or the steam generated by water heating shall help the block of residues (or its fragments) to be displaced, opening ways through those materials, making possible, consequently, to displace the fluid, and shall restablish the conditions for the retaking of the regular production flow.

Another advantage refers to the operational simplicity of the device and its coupling to the production lines already installed, in addition to the low cost of manufacturing and installation, dispensing with the use of special equipment sets for its utilization.

Still another is that the combination of those resources permits the clearing of the pipeline without the temperature being too high, which could damage the structure of the pipeline carrying viscous fluids. The ideal is to maintain the temperature in the range of 40°–60° C.

I claim:

1. Coupling device for a pipeline heating system for a flexible pipeline, comprising:
a segment of electrically conducting pipe (5) introduced in a terminal pipe of said flexible pipeline (1), electrically isolating elements (6, 7) maintaining said segment of pipe remote from an internal steel layer (3) of said flexible pipeline (1), said segment of electrically conducting pipe (5) having in an extremity thereof internal to the flexible pipeline a fastening element (8) which achieves electrical contact between the flexible pipe line (1) and the segment of electrically conducting pipe (5); and means for connecting another extremity of the segment of electrically conducting pipe (5) to a source of electrical power and said segment of electrically conducting pipe being fastened to the terminal pipe of the flexible pipeline (1) by means of a sealing element (10) and a terminal coupling element (9).

2. Coupling device for a pipeline heating system, according to claim 1, wherein said segment of electrically conducting pipe (5) is connected to a bifurcated pipe to permit the injection of special fluids, such as solvents, air or water, simultaneously along with the application of electricity to said segment of electrically conducting pipe (5).

* * * * *